United States Patent [19]

Platus et al.

[11] Patent Number: 5,669,594
[45] Date of Patent: Sep. 23, 1997

[54] VIBRATION ISOLATING SYSTEM

[75] Inventors: David L. Platus, Los Angeles; Donald A. Durran, Manhattan Beach, both of Calif.

[73] Assignee: Minus K Technology, Inc., Inglewood, Calif.

[21] Appl. No.: 434,979

[22] Filed: May 3, 1995

Related U.S. Application Data

[63] Continuation of Ser. No. 186,573, Jan. 25, 1994, abandoned, which is a continuation-in-part of Ser. No. 125,496, Sep. 22, 1993, abandoned, which is a continuation of Ser. No. 987,046, Dec. 4, 1992, abandoned, which is a continuation-in-part of Ser. No. 708,995, May 31, 1991, Pat. No. 5,178,357, which is a continuation-in-part of Ser. No. 681,808, Apr. 8, 1991, abandoned, which is a continuation-in-part of Ser. No. 395,093, Aug. 16, 1989, abandoned.

[51] Int. Cl.$^6$ .................................................. F16M 13/00
[52] U.S. Cl. .................................................. 248/619; 248/638
[58] Field of Search .................................. 248/619, 620, 248/621, 623, 603, 632, 638, 678; 267/140.5, 36.1

[56] References Cited

U.S. PATENT DOCUMENTS

| | | | |
|---|---|---|---|
| 2,924,420 | 2/1960 | Fink | 248/632 X |
| 3,223,400 | 12/1965 | Deister, Jr. | 248/619 X |
| 4,223,762 | 9/1980 | Gertal | 248/621 X |
| 4,789,023 | 12/1988 | Grant | 248/619 X |
| 4,871,142 | 10/1989 | DeMey, II | 248/632 |
| 5,040,764 | 8/1991 | Dubois | 248/638 X |
| 5,178,357 | 1/1993 | Platus | 248/619 |
| 5,310,157 | 5/1994 | Platus | 248/619 |
| 5,370,352 | 12/1994 | Platus | 248/619 |
| 5,390,892 | 2/1995 | Platus | 248/619 |

*Primary Examiner*—Ramon O. Ramirez
*Attorney, Agent, or Firm*—Fulwider Patton Lee & Utecht, LLP

[57] ABSTRACT

An improved version of vibration isolation systems using negative stiffness incorporates a payload and payload platform on just one 6-DOF isolator in a unique and innovatively compact configuration. The isolator includes a platform supported on an assembly of independently acting flexure mechanisms which are connected in serial fashion, tilt on top of horizontal on top of vertical, and in turn connected a base. Proper arrangement of the mechanisms and the payload/platform center of mass provides highly effective decoupled isolator performance. In addition, an innovative flexure preloading method which significantly improves vertical isolation performance is incorporated. This method can be used with prior (unsymmetric) designs or combined with a set of shear flexures in an innovative symmetric arrangement described below to provide more assurance of ideal decoupled response to mutually perpendicular base excitation input. A geared mechanism is also incorporated to facilitate manual adjustment of a main support spring whenever payload weight is changed.

16 Claims, 5 Drawing Sheets

VIBRATION ISOLATING SYSTEM

This is a continuation of application Ser. No. 08/186,573, filed Jan. 25, 1994, now abandoned, which is a continuation in part of application Ser. No. 08/125,496 filed Sep. 22, 1993 abandoned which is a continuation of application Ser. No. 07/987,046 filed Dec. 4, 1992 entitled "VIBRATION ISOLATION SYSTEM", abandoned which is a continuation-in-part of application Ser. No. 07/708,995, filed May 31, 1991, entitled "Vibration Isolation System", now U.S. Pat. No. 5,178,357, which is a continuation-in-part of application Ser. No. 07/681,808, filed Apr. 8, 1991, entitled "DAMPED VIBRATION ISOLATION SYSTEM", abandoned which is a continuation-in-part of application Ser. No. 395,093, filed Aug. 16, 1989, entitled "VIBRATION ISOLATION SYSTEM" abandoned.

BACKGROUND OF THE INVENTION

1 Field of the Invention:

This invention relates generally to suspension systems and methods for isolating and reducing the transmission of vibratory motion between an object and a base and, more particularly, to a compact omni-directional vibration isolation or suspension system that exhibits low stiffness, high damping to limit resonant responses of the system, effective isolation at the higher frequencies, high isolator resonant frequencies, and can accommodate changing weight loads without significantly degrading isolation system performance. This invention also relates more specifically to a class of suspension systems which provides six-degree-of-freedom isolation (translation and rotation in all directions) in which the isolator system is a single compact assembly centered underneath the platform in pedestal fashion, rather than an array of three or four isolators spread out around the periphery of the platform.

1 Description of Related Art:

The problems caused by unwanted vibration on equipment, devices and processes that are extremely motion sensitive have been widely researched and numerous solutions to prevent or reduce the transmission of vibratory motion have been proposed and developed. Many of the devices designed to reduce the transmission of unwanted vibration between an object and its surroundings, commonly called vibration isolators or suspension devices, have utilized various combinations of elements such as resilient pads made from a variety of materials, various types of mechanical springs, and pneumatic devices. There are, however, shortcomings and disadvantages associated with these particular prior art isolation systems which prevent them from obtaining low system natural frequencies and from limiting resonant responses to low values while providing high isolation performance at the higher frequencies.

These shortcomings and disadvantages of prior art systems were addressed through the-development of the novel vibration isolation systems and novel devices and methods for retro-fitting existing vibration isolation systems described in application Ser. No. 07/395,093, filed Aug. 16, 1989, entitled "VIBRATION ISOLATION SYSTEM", application Ser. No. 07/681,808 filed Apr. 8, 1991, entitled "DAMPED VIBRATION ISOLATION SYSTEM", application, Ser. No. 708,995, filed May 31, 1991, entitled "VIBRATION ISOLATION SYSTEM," and application Ser. No. 08/125,496 filed Sep. 22, 1993 entitled "VIBRATION ISOLATION SYSTEM", which are all hereby incorporated by reference in this present application. The particular vibration isolation systems described in these applications and utilized in connection with the present invention provides versatile vibration isolation by exhibiting low stiffness in an axial direction (generally the direction of the payload weight) and any direction substantially transverse to the axial direction (generally a horizontal direction), as well as tilt or rotation about three mutually perpendicular axes. The particular system utilizes a combination of uni-directional or hi-directional isolator subassemblies that can be connected together in series fashion to provide omni-directional isolation. Each isolator is designed to isolate the axial or the transverse component of any vibratory translation to effectively isolate vibrations along or about any directional axes. In subsequent discussions, an axial-motion isolator will be referred to as a vertical-motion isolator, and the system of axial-motion isolators will be referred to as the vertical-motion isolation system. Similarly, a transverse-motion isolator will be referred to as a horizontal-motion isolator, and the system of transverse-motion isolators will be referred to as the horizontal-motion isolation system. Lastly, a tilt-motion isolator in conjunction with a mechanism allowing rotation about an axis parallel to the tilt axes will be referred to as the tilt-motion isolation system.

In the embodiments described in the above-noted applications, the isolator relies on a particular principle of loading a particular elastic structure which forms the isolator or a portion of it (the loading being applied by either the supported weight or by an external loading mechanism) to approach the elastic structure's point of elastic instability. This loading to approach the point of elastic instability, also called the "critical buckling load" of the structure, causes a substantial reduction of either the vertical or the horizontal stiffness of the isolator to create an isolation system that has low stiffness in the vertical and in any horizontal direction, and increases the damping inherent in the structure. While stiffness is reduced, these isolators still retain the ability to support the payload weight.

If the load on an elastic structure with an instability is greater than the critical buckling load, the excessive load will tend to propel the structure into its buckled shape, creating a "negative-stiffness" or "negative-spring-rate" mechanism. By combining a negative-stiffness mechanism with a spring, adjusted so that the negative stiffness cancels or nearly cancels the positive stiffness of the spring, one obtains a device that can be placed at or near its point of elastic instability. The magnitude of the load causing the negative stiffness can be adjusted, creating an isolator that can be "fine tuned" to the particular stiffness desired.

SUMMARY OF THE INVENTION

The present invention provides a method to achieve mass properties of a combined payload and payload platform which, when supported by one of the 6-DOF isolators described in my co-pending application (Ser. No. 08/125,496) or as described herein with added novel and significant improvements, results in an isolation system that is unusually compact and simple without compromising any performance features. The method provides for adjustment of platform mass properties and tilt flexure stiffness so that the platform can accommodate passively a small amount of redistribution in payload weight, as occurs for example in systems with moving stages. A novel and effective method has been devised to add small, discrete damping elements to control resonant amplitudes, while still providing nearly ideal damped high frequency isolation. Unique and significant improvements have also been added to the isolation mechanism with a radial flexure preload system which uses an internal tension member and soft spring that is selfcontained rather than requiring a separate external load path to "ground". This preload method can be used in any of my prior designs, or in a novel symmetric arrangement of vertical plate flexures described herein that eliminates a potential source of vertical and lateral motion coupling. This preload method greatly simplifies the radial flexure preloading and fine tuning processes. The present invention also includes an improvement by superimposing a gear wheel on the vertical load adjustment-screw, such that it can be driven by a shaft-mounted worm gear. The shaft extends to the exterior of the isolator to better facilitate manual adjustment.

Briefly, the present invention is directed to a single isolator platform, particularly the arrangement and functioning of the isolator components which makes effective omnidirectional vibration isolation possible in a single isolator design. The present invention is an extension of the isolator described in my co-pending application (Ser. No. 08/125, 496), with the addition of a platform and payload whose combined center-of-mass (CM) is made to coincide or nearly coincide with the vertical, horizontal and rotational force center of the isolator. The vertical and horizontal force centers of the isolator are those points at which small vertical or horizontal forces, respectively, applied to the isolator cause only vertical or horizontal translation, respectively, without rotation. The rotational force center is the point at which a small moment applied to the isolator causes rotation only and no translation. This method works with any 6-DOF isolator that possesses a common point through which the net vertical, horizontal and rotational reaction forces act. This point in the present invention is the mid-point of the tilt flexure. Placement of the CM at or near the mid-point of the tilt flexure provides this essential feature in the present invention.

The present invention utilizes a platform with mass properties such that, when combined with the payload mass properties, results in a combined CM that is located at or very near the midpoint of the tilt flexure. The tilt flexure is supported on, and is operationally in series with the horizontal-motion isolator which is supported on, and is operationally in series with the vertical-motion isolator which is supported on the base or the vibrating foundation. Small shifts in the payload CM, as might occur for example during stepper stage motion, are accommodated by a tilt flexure with sufficient stiffness to resist any static imbalance, along with sufficient rotational inertia to limit attendant angular acceleration. Small loose weights can be placed on the platform for initial leveling. Leveling centers the payload platform with respect to the tilt stops for equal tilt accommodation in all directions, and keeps the CM directly above the tilt flexure to avoid tilt vertical-motion coupling. Vertical location of the CM with respect to the tilt flexure is important to minimize or effectively eliminate tilt-lateral motion coupling.

One embodiment of the present invention incorporates an innovative and simpler means of applying and finely adjusting preload on the radial flexures. This preload provides negative stiffness in the vertical direction. Preloading is achieved in the present invention by merely turning (tightening) a loading spring adjustment screw after the unit is aligned and assembled.

In the present invention, tensioning means—that is, a tension bolt-passes right through a widely clearanced hole made in the center hub and operationally attaches to the far ends of the opposing radial flexures. This device does not require a separate load path to "ground" as represented by the loading cantilevers and adjustment cantilevers in previously described embodiments. Instead, it "floats" along with the center hub and radial flexure subassembly. Between one end of the tension bolt and the corresponding outer end of one set of radial flexures is a soft die spring which provides a higher degree of compliance and more constant preload force than was possible with the adjustment and loading cantilevers, thus allowing longer travel of the vertical isolator. The more travel that can be built into an isolator, the larger the displacement disturbance that can be accommodated; thus, the better the performance. At its other end the tension bolt threads into a block, such that setting or adjusting radial flexure preloading—both coarse and fine—is achieved by turning this tension member into or out of the block.

For this new preloading method to work, the support structure at the outer end of the radial flexures on at least one side must be very compliant relative to the die spring stiffness because, upon deflection of the center hub, the preload will actually be reduced in accordance with the stiffness of that outer support point and the degree to which the radial flexures shorten. In the present invention, this compliance is provided by a single thin, but wide, "sheet metal" flexure. The width provides needed stiffness in the direction perpendicular the radial flexures, and the reduced thickness provides compliance in the radial direction.

Another embodiment of the present invention incorporates elastomeric damping elements into the vibration isolation system in order to control transmissibility at the system natural frequencies. The elastomeric material exhibits the desired, nearly classical visco-elastic damping effect. The elements are attached to parts of the isolator that move relative to one another, where the relative motion represents a degree of freedom to be isolated. Each degree of freedom can be selectively damped. A symmetric arrangement of elements is normally used for each damped degree of freedom. Various shapes—such as cylinders or U-shaped channels—and thicknesses are used to achieve specific amounts of damping for each degree of freedom. For example, damping only for the tilt-motion can be provided by a set of three U-shaped elements placed between the payload plate and the column top plate, each at an equal distance from the center of the isolator and at an angular spacing of one hundred and twenty (120) degrees. The isolator has simple interfacing features designed and built in so that damping elements can be easily retro-fitted, removed or replaced.

The present invention improves performance by eliminating a source of coupling between the vertical and lateral motions. The vertical-motion mechanism must be stiffly restrained laterally to maintain stability of the mechanism and to avoid low internal isolator resonances. The center hub and radial flexure subassembly is restrained on all four sides in a balanced fashion by vertical "plate" type or sheet metal flexures which restrain the center hub against lateral motion by in-plane shear resistance. The thin and wide sheet metal flexure supports the outer end of the radial flexures on both sides of the center hub, not just one. Another pair of sheet metal flexures are arranged in a similar fashion in the same plane but perpendicular to the radial flexures, and are attached to the, center hub by a corresponding pair of very thin and wide (radial) plate flexures. Thus, lateral motion of the center hub is prevented by the same type of mechanism in both (mutually perpendicular) directions. The plate flexures are inherently very stiff against in-plane shear deformation.

A worm gear subassembly has been added for an improved means of load adjustment. During installation and set-up, the vertical "null" position of the real operating payload must get positioned to midpoint of the vertical stroke. This is accomplished with a load adjustment screw that raises or lowers the base of the main vertical load carrying spring. The adjustment screw is at the center of the isolator, and in present invention the screw has a gear-tooth outer circumference that meshes with a worm gear mounted on a shaft extending out through the cover of the isolator assembly. The exposed end of shaft is readily turned by hand.

DETAILED DESCRIPTION OF THE PREFERRED EMBODIMENT

Figure 1:
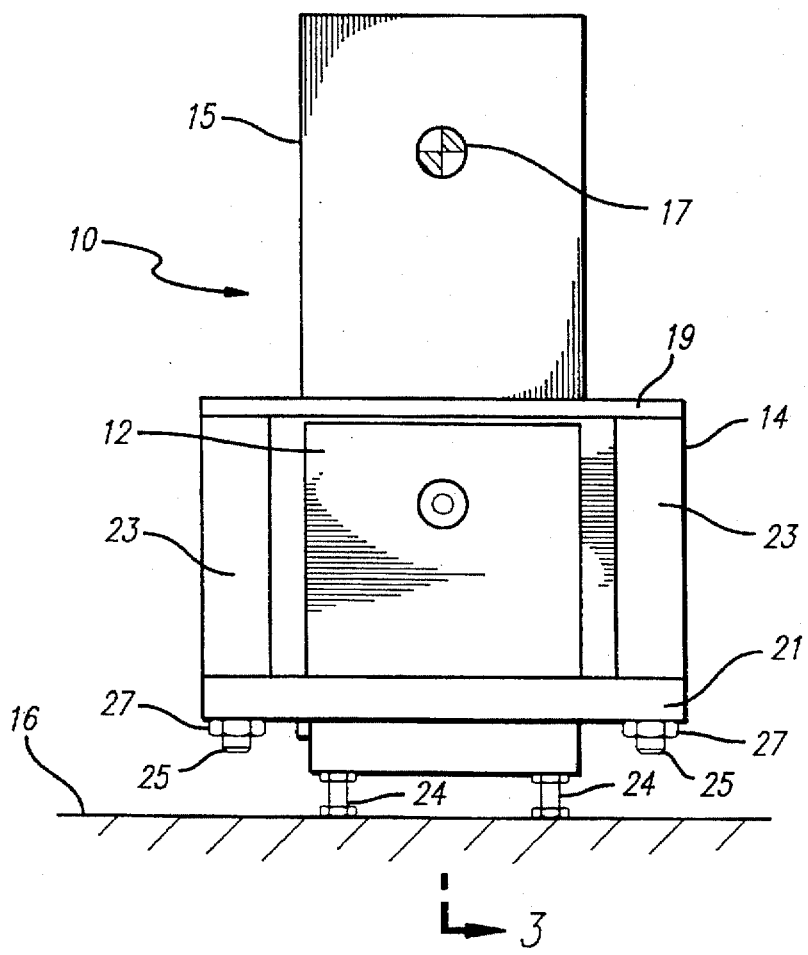
FIG. 1 is an elevation view of one embodiment of a vibration isolation system made in accordance with the present invention showing an isolator, a weighted platform and a payload.

As shown in the drawings for purposes of illustration, the present invention is embodied in a more compact vibration-isolating suspension system comprising a payload supported on a weighted platform which is in turn supported on a single vibration isolator. Vertical-motion isolators made in accordance with the present invention are capable of larger vertical deflections with less stiffening due to nonlinear effects, easier adjustment of vertical stiffness and possible improved performance by elimination of a possible source of vertical-motion and horizontal-motion coupling.

FIG.1 shows one embodiment of an isolation system made in accordance with the present invention. The system 10 uses a single composite 6-DOF isolator 12 that supports a weighted platform 14 that in turn supports a payload 15 with center-of-mass (CM) 17. The isolator 12 and platform 14 support the payload 15 relative to a foundation 16 and reduce the transmission of omnidirectional vibrations between the payload 15 and foundation 16.

Figure 2:
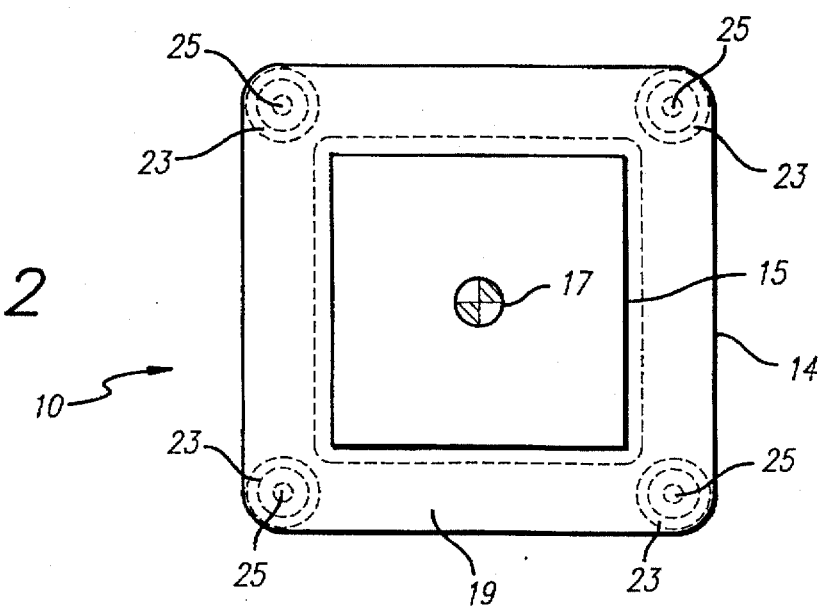
FIG. 2 is a plan view of the isolation system shown FIG. 1.

Referring now to FIG. 1 and 2, one embodiment of a weighted platform is illustrated. The platform 14 includes an upper plate 19 that is connected to a weight ring 21 by four tubes 23 and threaded rods 25 that screw into the plate 19 and hold the plate 19, the ring 21 and tubes 23 together with nuts 25. The weight ring 21 lowers the CM of the platform 14 so that the combined CM of the platform 14 and payload 15 with CM 17 is at or very near the center of the tilt flexure of the isolator 12, which corresponds to the vertical, horizontal and rotational center of the isolator. With this configuration tilt-horizontal-motion coupling and tilt-vertical -motion coupling is eliminated or nearly eliminated. Location of the CM of the payload directly or nearly directly over the tilt flexure can be accomplished by moving the payload 15 on the platform 14, or by moving loose weights (not shown) on the platform. This also levels the platform 14 to keep it floating off tilt stops in the isolator.

Referring now to FIGS. 1, 3, 4, 5 and 6, one embodiment of an isolator made in accordance with the present invention is illustrated. As in the composite isolator described in my co-pending application, Ser. No. 08/125,496, the isolator comprises a vertical-motion isolator operatively connected vertically in series with a horizontal-motion isolator which is operatively connected vertically in series with a tilt-motion isolator. The vertical-motion, horizontal-motion and tilt-motion isolators are arranged in the same general configuration as in that co-pending application.

The vertical-motion isolator of the present invention includes a support spring 18 in the form of a coil spring that operatively connects between a center hub assembly 20 and a base plate 22 that is connected to the foundation 16 by three leveling screws 24. The center hub assembly 20 comprises a center block 63, a center clamp 65, a center plate 67 and the upper spring support 29, clamped together with screws 69 and 39. A negative-stiffness mechanism also connects to the center hub assembly 20 to cancel stiffness from the support spring 18, and includes radially-compressed radial flexures 60. Clamps 32 secure the support spring 18 to the upper spring support 29 and to a lower spring support 30, and an anti-rotation device 31. Improvements in accordance with the present invention include the means for supporting and loading the radial flexures 60, the means for constraining horizontal motions of the center hub assembly 20 and the means for manually raising and lowering the lower spring support 30 to accommodate changes in weight load. These will be described later.

Figure 3:
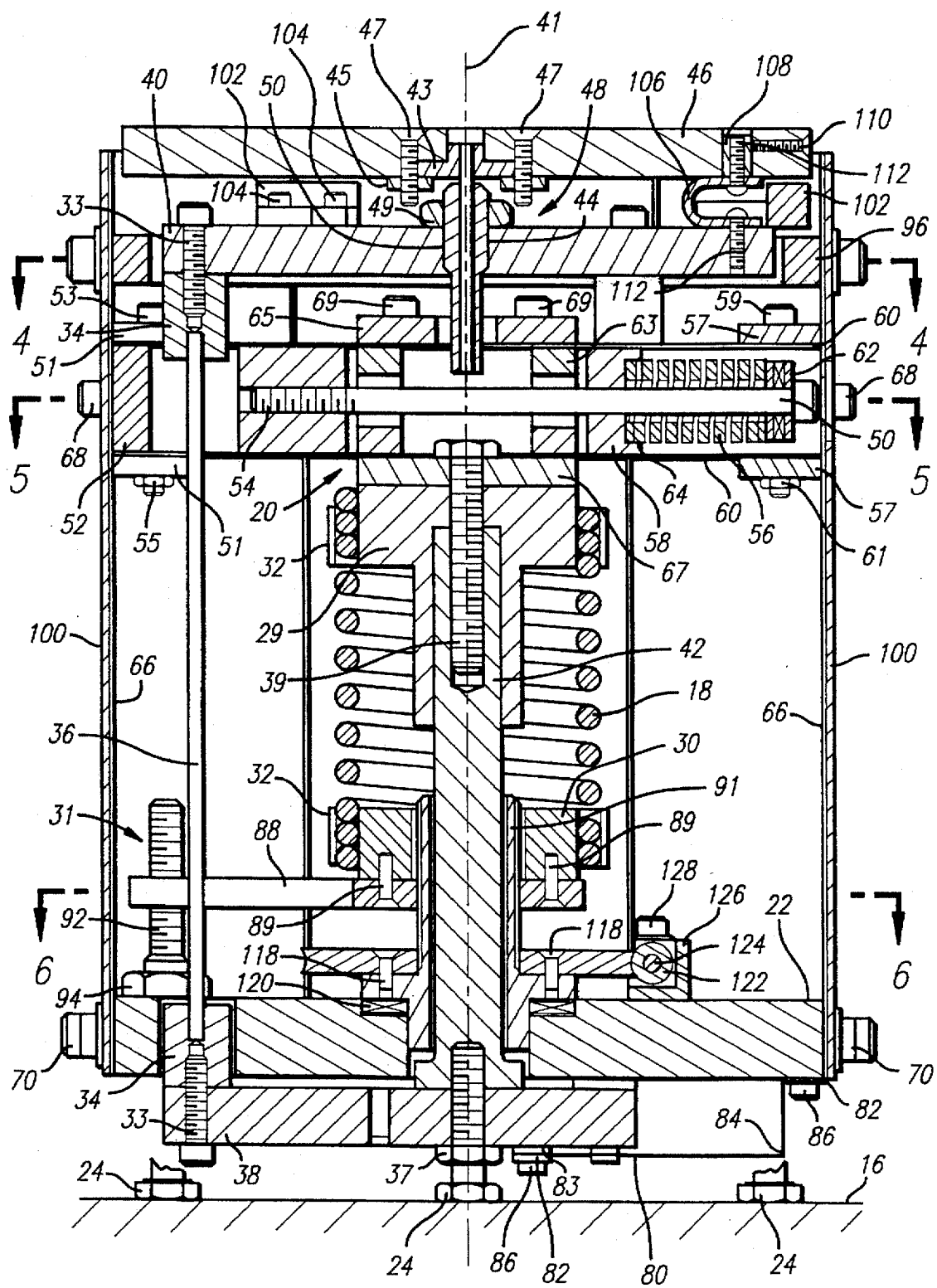
FIG. 3 is a partial cross-sectional side view of the isolator shown in FIG.1 taken along line 3—3.
Figure 4:
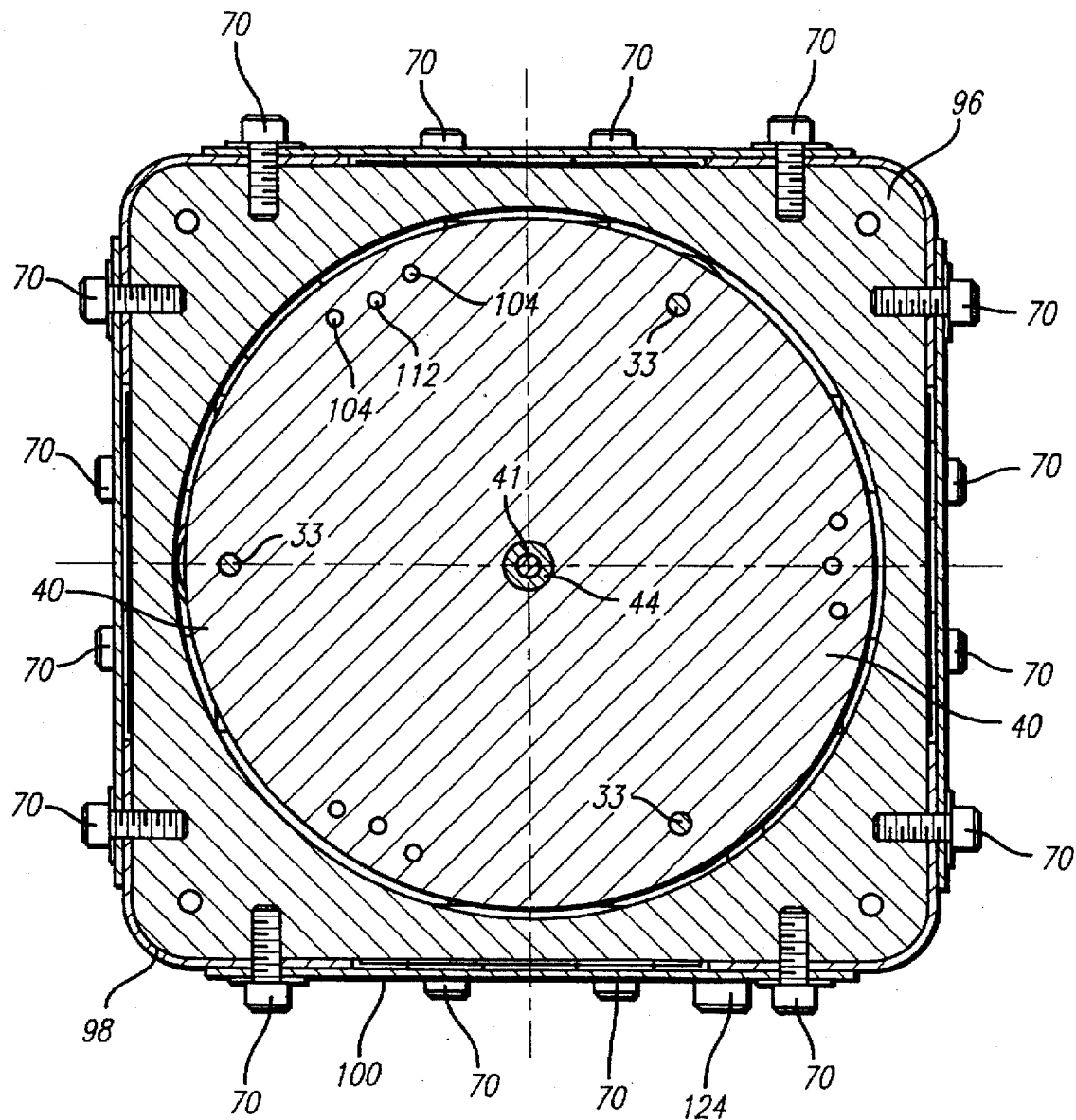
FIG. 4 is a partial cross-sectional plan view of the isolator shown in FIG. 1 taken along line 4—4 in FIG. 3.
Figure 5:
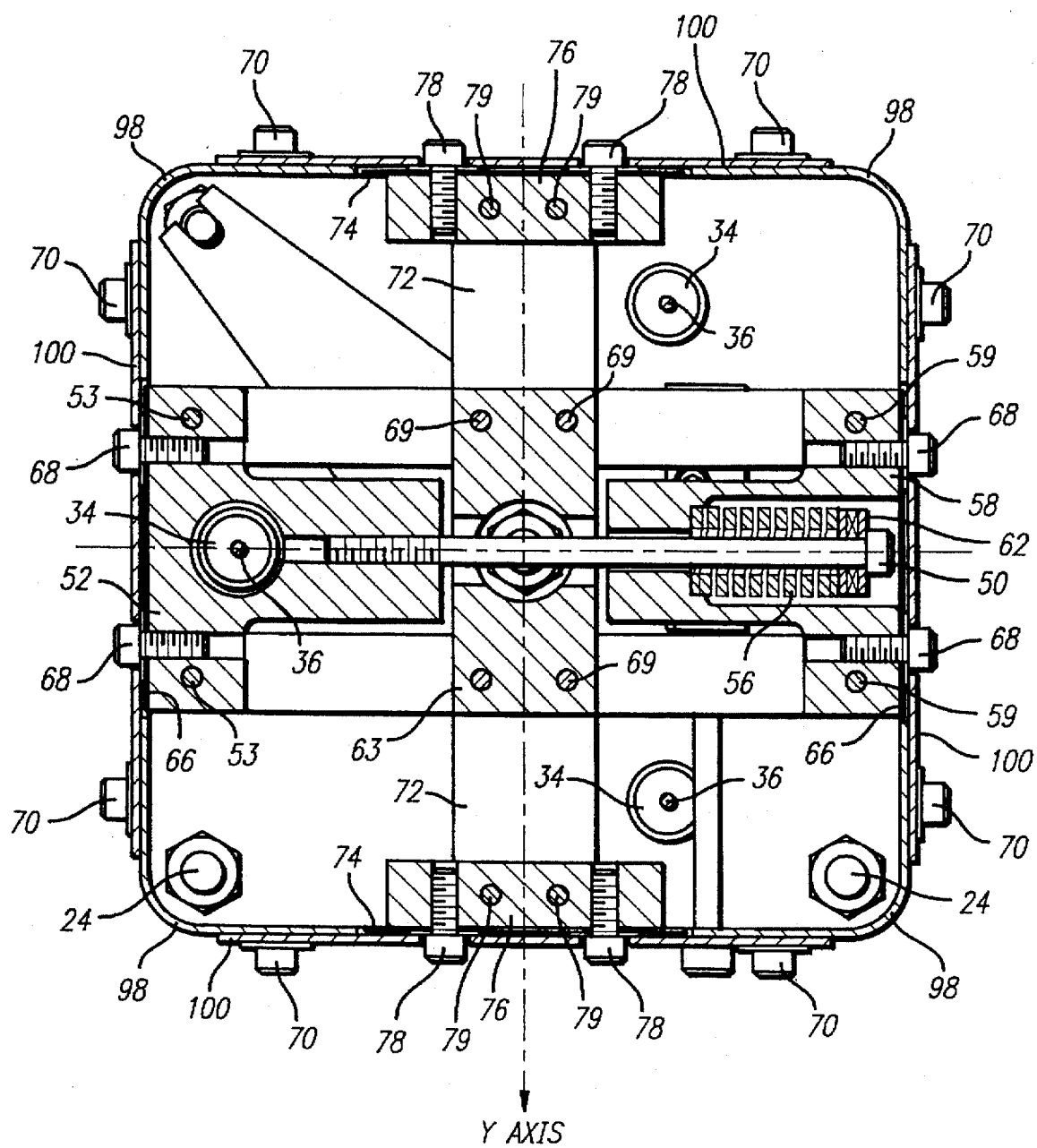
FIG. 5 is a partial cross-sectional plan view of the isolator shown in FIG. 1 taken along line 5—5 in FIG. 3
Figure 6:
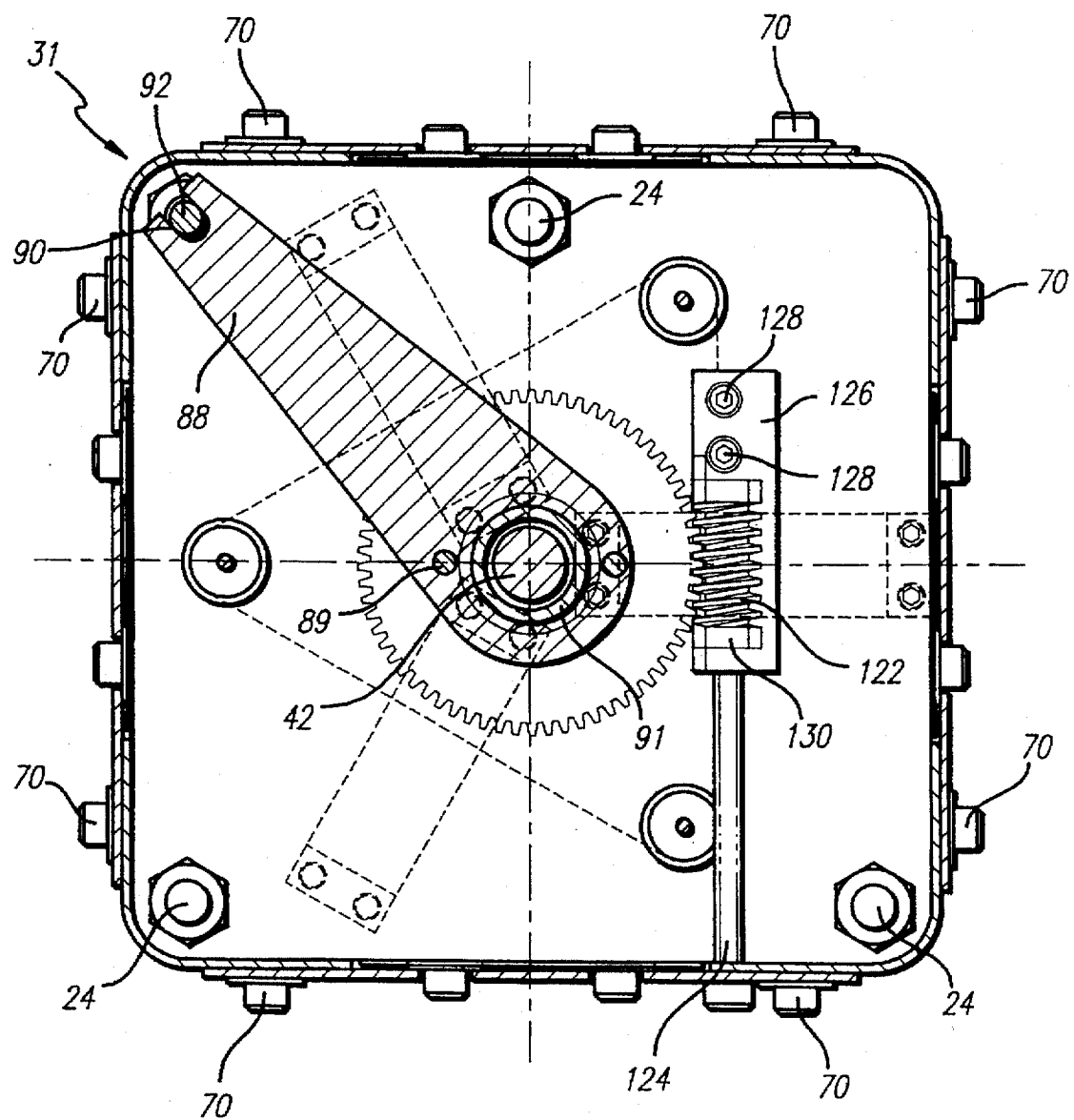
FIG. 6 is a partial cross-sectional plan view of the isolator shown in FIG. 1 taken along line 6—6 in FIG. 3.

The horizontal-motion isolator comprises three flexible beam-columns 36 (only one of which is shown in FIG. 3) in the form of thin cylindrical rods that are operatively connected between a lower column plate 38 and an upper column plate 40. The beam-columns 36 are press-fit into end fittings 34 which are attached to the upper column plate 40 and to the lower column plate 38 with screws 33. The lower column plate 38 connects to a stiff support shaft 42 with screw 37. The support shaft 42 is connected with screw 39 to the upper spring support 29 and to the center plate 67 which are part of the center hub assembly 20, thereby providing a relatively rigid connection between the top of the vertical-motion isolator and the bottom of the horizontal-motion isolator. The upper column plate 40 which is the top of the horizontal-motion isolator connects to a top mounting plate 46 through a tilt flexure assembly 48 which acts as the tilt-motion isolator. The tilt flexure assembly 48 comprises a tilt flexure 41 which is a thin cylindrical rod press-fit into end fittings 43 and 44 which are secured to the top mounting plate 46 and upper column plate 40. End fitting 41 is secured to the top mounting plate 46 with tilt flexure retainer 45 and screws 47. End fitting 46 is threaded at its outside surface 50 and is screwed into the upper column plate 40 and secured with lock nut 49.

An isolator cover comprises four cover panels 100 and four corner panels 98 that attach to the base plate 22 with screws 70. A stop plate 96 also attaches to the cover panels 100 and corner panels 96 with screws 70 and serves as the down-motion stop with three motion stops 102 spaced 120 degrees and attached to upper column-plate 40 with screws 104. The motion stops 102 also serve as tilt-motion stops to limit tilt of the top mounting plate 46 with respect to the upper column plate 40.

Three tilt dampers 106 spaced at 120 degrees comprise U-shaped strips of viscoelastic damping material attached between the upper column plate 40 and the top mounting plate 46. Screws 112 attach the lower ends of the dampers 106 to the upper column plate 40 and the upper ends of the dampers 106 to bushings 108 secured in holes in the top mounting plate with set screws 110.

The four radial flexures 60 are clamped to load block 52, the center hub assembly 20 and spring block 58 and are compressed using a tension screw 50 and die spring 56. The flexures 60 are clamped to load block 52 using clamps 51, with bolts 53 and nuts 55 and they are clamped to spring block 58 using clamps 57 with bolts 59 and nuts 61. They are clamped to the center hub between clamp 65 and plate 67 and the center block 63 with screws 69. The threaded end 54 of tension screw 50 screws into load block 52 and the head of screw 50 bears against a thrust bearing 62 which bears against die spring 56 which is recessed into cavity 64 in spring block 58. Preloading the radial flexures 60 and fine tuning the load to adjust the negative-stiffness effect are both accomplished by turning screw 50. The blocks 52 and 58 are attached to vertical thin-sheet flexures 66 by screws 68. The flexures 66 are attached at their lower ends to base plate 22 using screws 70.

This method of supporting and compressing the radial flexures 60 provides a constant compressive force on the flexures 60 by permitting a softer spring means to load the radial flexures 60 and a softer support structure in the radial direction. As the center hub 20 deflects vertically, the radial flexures 60 shorten in the radial direction thereby reducing the compressive load and the negative-stiffness effect and increasing the vertical stiffness of the isolator and the vertical natural frequency of the system. The softer the elastic structure providing the compressive load, the more constant the compressive load as the center hub deflects away from its equilibrium center position and the smaller the increase in vertical stiffness and vertical natural frequency. In the present configuration, the stiffness of the die spring 56 and the flexures 66 affect the reduction in compressive load as the radial flexures 60 shorten since these elements act in parallel. The flexures 66 are very flexible in the radial direction parallel to the radial flexures but very stiff in the horizontal direction perpendicular to the radial flexures. This method of support constrains the center hub against deflections in directions perpendicular to the radial flexures 60. Two additional thin-sheet shear flexures 72 are oriented horizontally and are clamped under the lower radial flexures 60 to the center hub assembly 20 and to blocks 76 with screws 79. The blocks 76 are attached to vertical thin-sheet flexures 74 with screws 78. The flexures 74 are attached near their bottom ends to the edge of base plate 22. The shear flexures 72 are stiff in directions parallel to the radial flexures 60 and constrain the center hub 20 from displacements it this direction. They are very flexible in bending and, with the high flexibility of the flexures 74 in a horizontal direction perpendicular to the shear flexures 72 they add little vertical stiffness to the isolator. Thus, with the system of flexures described that support the radial flexures 60 and connect to the center hub assembly 20 and base plate 22, the center hub assembly 20 is constrained with high stiffness against movement in the horizontal plane.

Three bottom flexures 80 (FIG. 3 and hidden lines in FIG. 6) spaced 120 degrees apart and operatively connected between the lower column plate 38 and the base plate 22 provide a stiff constraint for the lower column plate 22 and the lower end of support shaft 42 against horizontal motion. These flexures with the other flexures in the system provide a stiff constraint for the center hub assembly 20 against all motions of the mass associated with the center hub assembly 20, the support shaft 42 and lower column plate 38, relative to the base plate 22, thereby producing high internal structural resonances of the isolator structure associated with these modes of deformation. These modes can represent the lowest isolator structural resonant frequencies.

The anti-rotation device 31 prevents torsional deformation of support spring 18 as the lower spring support 30 is raised and lowered to accommodate changes in weight load on the isolator. The anti-rotation device 31 comprises a plate 88 that is clamped to the lower spring support 30 with screws 89 and has a U-shaped slot 90 that engages a stop post 92 that is screwed into a hole in base plate 22 and secured with lock nut 94. The plate 88 has a threaded hole that engages a threaded support tube 91 that is supported on a thrust bearing 120 that is contained in a recess in base plate 22. A worm gear 116 is attached to support tube 91 with screws 118 and engages worm 122 that is mounted on adjusting screw/shaft 124 that runs on bearings in housing 126 that is attached to base plate 22 with screws 128. The worm is secured to adjusting screw/shaft 124 with pin 130. Rotation of screw/shaft 124 raises or lowers the lower spring support 30 to accommodate changes in weight load on the isolator.

A novel feature of the present invention as illustrated in FIGS. 1–6 is the use of a weighted platform on a single 6-DOF isolator made in accordance with the present invention to provide a compact and efficient isolated platform for reducing the transmission of vibrations between an object and a base. An important feature of the isolator that permits its use in this manner results from its vertical, horizontal and rotational force centers all coinciding at a point corresponding to the mid-point of the tilt flexure 41 near the top of the isolator. This feature results from the use of a vertical-motion isolator operatively in series with a horizontal-motion isolator which is operatively in series with a tilt-motion isolator. By using a weighted platform with its CM below the isolator force center to balance an object on the platform with its CM above the isolator force center, the combined CM of the platform, object and ballast weights, if needed, can be located at or near the isolator force center to decouple or nearly decouple the vertical, horizontal and rocking input vibrations to give optimum or near-optimum isolation performance. Having the isolator force center at the tilt flexure 41 near the top of the isolator permits a compact weighted platform that accommodates an object with a reasonably high CM relative to its base. Locating the CM of the object, or object and ballast if needed, above or nearly above the tilt flexure 41 can be achieved by moving the object 15 and/or ballast weights (not shown in the figures) on the platform 14 in order to float the top mounting plate 46 off the tilt stops 102 and to provide what leveling is needed. Locating the CM of the total suspended weight vertically at or near the isolator force center can also be achieved with the aid of ballast weights and/or vertical spacers for the payload or object supported on the platform. The tubes 23 that locate the weight ring 21 relative to the platform upper plate 19 can also be varied in length. It is not necessary to have the CM of the total suspended weight right at or very close to the isolator force center. A significant amount of coupling between the vertical, horizontal and rocking motions can be tolerated and the system can still provide effective isolation.

The tilt flexure 41 can be stiffened as necessary to readily facilitate floating the top mounting plate 46 off the tilt stops 102 and leveling the mounting plate. This increases the rocking natural frequencies of the system but very low vertical and horizontal natural frequencies can be maintained. Higher rocking frequencies can usually be tolerated because rocking vibration inputs are typically very small compared with vertical and horizontal vibration inputs. Tilt damping can also serve to limit the resonant rocking responses.

Another novel feature of the present invention is the use of a soft spring to load the radial flexures 60 and provide a more constant radial load and negative-stiffness stiffness effect for the vertical-motion isolator, along with the novel use of a system of flexures to provide a stiff restraint against motion of the center hub and associated mass to maintain high isolator structural resonant frequencies. This feature allows a simpler means of preloading and fine-tuning the compressive load on the radial flexures 60, and provides a more constant vertical stiffness during vertical deflection of the isolator due to less reduction in radial load associated with shortening of the radial flexures. The particular isolation system configuration and construction methods illustrated in FIGS. 1–6 is just one of many arrangements which can incorporate the novel features of the present invention. Other configurations and construction methods will become apparent to those skilled in the art. For example, instead of supporting the load block 52, and thereby the left ends of the radial flexures 60, on thin-sheet flexures 66, this load block 52 could be attached to a stiff plate structure that connects to the base plate 22 similar to the construction in my co-pending application (Ser. No. 08/125,496). The shear flexures 72 could then be eliminated since the center hub assembly 20 would be restrained in the radial direction by the radial stiffness of the radial flexures 60 and the stiff plate structure. There would be some coupling between vertical and horizontal motions of the isolator as the center hub is pulled toward the stiff plate structure from shortening of the radial flexures from vertical displacement of the center hub, but this effect would be very small.

The elements making up the present structure can be made from common structural materials such as steel and aluminum alloys. Other structural materials having suitable strength, elastic and mass properties can also be used.

While one particular form of the invention has been illustrated and described, it will be apparent that various modifications can be made without departing from the spirit and scope of the invention. Accordingly, it is not intended that the invention be limited, except by the attached claims.

What is claimed is:

1. An omni-directional vibration isolation suspension system for supporting an object having a center-of-mass in an equilibrium position relative to a base while suppressing transmission of vibratory motion between the object and the base, comprising:

a vertical-motion isolator for isolating vibratory motion in a vertical direction operatively connected in series with a horizontal-motion isolator for isolating vibratory motion in a horizontal direction;

a tilt-motion isolator for isolating tilt motion operatively connected in series with either of said vertical-motion isolator and horizontal motion-isolator; and a platform operatively supported by said vertical-motion, horizontal-motion and tilt-motion isolators upon which the object rests, said platform having a center-of-mass below the center-of-mass of the object such that the combined center-of-mass of the platform and object is located relative to said vertical-motion isolator, horizontal-motion isolator and tilt-motion isolator to substantially decouple the vertical, horizontal and tilt motions of the system.

2. An omnidirectional vibration-isolating suspension apparatus for supporting an object in an equilibrium position relative to a base while suppressing transmission of vibratory motion between the object and the base, comprising:

a vertical-motion isolator for isolating vibratory motion in a vertical direction operatively connected in series with a horizontal-motion isolator for isolating vibratory motion in a horizontal direction and a tilt-motion isolator for isolating tilt motion, said vertical-motion isolator having force-supporting capability in the vertical direction for supporting the object while having relatively high stiffness in any horizontal and rotational direction and relatively low stiffness in the vertical direction;

said horizontal-motion isolator having force-supporting capability in the vertical direction for supporting the object and relatively high stiffness in the vertical direction and low stiffness in any horizontal direction; and said tilt-motion isolator having force-supporting capability in the vertical direction for supporting the object and relatively low tilt stiffness for reducing tilt vibration between the object and the base.

3. The omnidirectional vibration-isolating suspension apparatus as defined in claim 2 wherein the object has a center-of-mass and said apparatus further includes a platform operatively supported by said vertical-motion, horizontal-motion and tilt-motion isolators upon which the object rests, said platform having a center-of-mass below the center-of-mass of the object such that the combined center-of-mass of the platform and object is located relative to said vertical-motion isolator, horizontal-motion isolator and tilt motion isolator to substantially decouple the vertical, horizontal and tilt motions of the apparatus.

4. The omnidirectional vibration-isolating suspension apparatus as defined in claim 3 wherein said platform comprises:

an upper plate for holding the object which is supported on the vibration-isolating suspension apparatus; and a weighted mass attached to said upper plate for lowering the center-of-mass of the platform.

5. The omnidirectional vibration-isolating suspension apparatus as defined in claim 2 wherein the vibration-isolating suspension apparatus includes a plurality of vertical-motion isolators, horizontal-motion isolators and tilt-motion isolators operatively connected in series.

6. The omnidirectional vibration-isolating suspension apparatus as defined in claim 2 further including:

means for damping at least one of said vertical-motion, horizontal-motion or tilt-motion isolators through attachment of an elastomeric damping element to parts of the isolator that move relative to one another to control transmissibility at natural frequencies of the combination of the object and suspension apparatus.

7. A vibration isolator having force-supporting capability in the vertical direction for supporting an object in an equilibrium position relative to a base while suppressing transmission of vibratory motion between the object and the base, comprising:

a base platform;

spring means having first and second ends for providing positive stiffness in the vertical direction and having force-supporting capability in the vertical direction for supporting the object;

means for producing negative stiffness in the vertical direction operatively connected with said spring means, wherein said spring means and said negative-stiffness-producing means combine to produce low vertical stiffness;

a first spring support near the first end of said spring means;

a second spring support near the second end of said spring means;

means for translating the second end of said spring means relative to said first end of said spring means; and anti-rotation means to inhibit rotation of the second end of said spring means relative to the first end of said spring means when the second end of spring means is translated relative to the first end.

8. The vibration isolator as defined in claim 7 further including:

a threaded support tube rotationally mounted with said base platform;

a worm gear attached to said support tube;

a screw shaft which engages said worm gear to rotate said threaded support tube when said screw shaft is rotated;

wherein said second spring support moves vertically when said screw shaft is rotated.

9. A vibration isolator having force-supporting capability in a vertical axial direction for supporting an object in an equilibrium position relative to a base while suppressing transmission of vibratory motion between the object and the base comprising:

a base platform;

spring means having a first and a second end for providing positive stiffness in the vertical direction and having force-supporting capability in the vertical direction for supporting the object, said spring means being operatively connected with said base;

a central hub assembly attached to said first end of said spring means for supporting the object;

means for producing negative stiffness in the vertical direction operatively connected with said central hub assembly wherein said spring means and said negative-stiffness-producing means combine to produce low axial stiffness, said negative-stiffness-producing means comprising a first and second radial flexure assembly, each radial flexure assembly being oriented in a direction transverse to the vertical direction and having first and second ends, wherein said first end of said first radial flexure assembly attaches to a first block member and said second end of said first radial flexure assembly attaches to said central hub assembly, said first end of said second radial flexure assembly attaches to said central hub assembly and said second end of said second radial flexure assembly attaches to a second block member, said first and second block members being connected to said base platform, said negative-stiffness-producing means including tensioning means for tensioning said first block member relative to said second block member to produce a compressive loading on said first and second radial flexure assemblies.

10. The vibration isolator as defined in claim 9 further including adjustment means for adjusting the amount of tension exerted between said first and second block members in order to adjust the amount of compressive force loaded on said first and second radial flexure assemblies.

11. The vibration isolator as defined in claim 9 wherein said first block member is attached to the base platform by a first thin flexure which has one end attached to the platform and another end attached to the first block member and said second block member is attached to the base platform by a second thin flexure which has one end attached to the platform and another end attached to the second block member.

12. The vibration isolator as defined in claim 11 wherein said first and second flexures are made from a piece of sheet material having a width which provides stiffness in vertical and horizontal directions perpendicular to said first and second radial flexure assemblies.

13. The vibration isolator as defined in claim 12 wherein said first and second flexures have a thickness which provides compliance in the direction parallel to said first and second radial flexure assemblies.

14. The vibration isolator as defined in claim 9 wherein said tensioning means comprises:

a compression spring; and a tension screw having one end threadingly engaged with said first block member and a second end contacting said compression spring, said compression spring being disposed between said second end of said tension screw and said second block member to exert a force between said first and second block members.

15. The vibration isolator as defined in claim 14 wherein said adjustment means comprises said tension screw.

16. The vibration isolator as defined in claim 9 further including a first and second shear flexure, each shear flexure having first and second ends, wherein said first end of said first shear flexure attaches to a block member and said second end of said first shear flexure attaches to said central hub assembly, said first end of said second shear flexure attaches to said central hub assembly and said second end of said second shear flexure attaches to another block member, each shear flexure being oriented in a radial direction transverse to the vertical direction and substantially perpendicular to said radial flexure assemblies, each of said block members being connected to a flexure which is attached to said base platform, each of said first and second shear flexures having stiffness in directions parallel to said radial flexure assemblies to constrain the center hub from displacements in a horizontal plane.

* * * * *

UNITED STATES PATENT AND TRADEMARK OFFICE
CERTIFICATE OF CORRECTION

PATENT NO. : 5,669,594
DATED      : Sep. 23, 1997
INVENTOR(S) : David L. Platus, Donald A. Durran It is certified that error appears in the above-identified patent and that said Letters Patent is hereby corrected as shown below:

Column 2, Line 8, Change "hi-directional", to read
-- bi-directional--.

Signed and Sealed this

Second Day of June, 1998

Attest:

BRUCE LEHMAN

Attesting Officer

Commissioner of Patents and Trademarks